W. BROWN.
BRUSH HOLDER AND CONDUCTOR TERMINAL.
APPLICATION FILED JAN. 19, 1918.
1,314,182.
Patented Aug. 26, 1919.
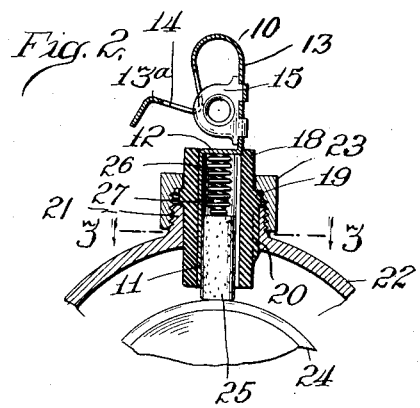
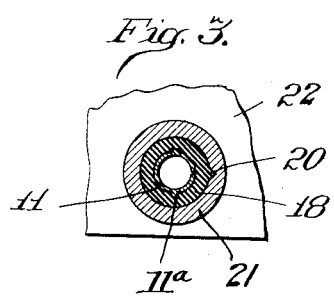
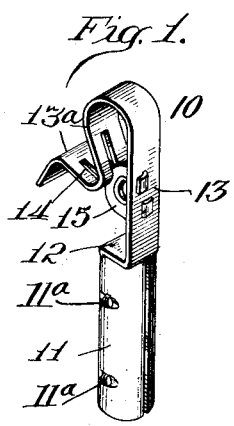
Witnesses
Inventor
Walter Brown.
by Williams, Bradbury &c
Attorneys

UNITED STATES PATENT OFFICE.

WALTER BROWN, OF RACINE, WISCONSIN, ASSIGNOR, BY MESNE ASSIGNMENTS, TO WEBSTER ELECTRIC COMPANY, OF RACINE, WISCONSIN, A CORPORATION OF WISCONSIN.

BRUSH-HOLDER AND CONDUCTOR-TERMINAL.

1,314,182.  Specification of Letters Patent.  Patented Aug. 26, 1919.

Application filed January 19, 1918. Serial No. 212,580.

*To all whom it may concern:*

Be it known that I, WALTER BROWN, a citizen of the United States, residing at Racine, in the county of Racine and State of Wisconsin, have invented a certain new and useful Improvement in Brush-Holders and Conductor-Terminals, of which the following is a full, clear, concise, and exact description, reference being had to the accompanying drawings, forming a part of this specification.

My invention relates to a combined brush holder and terminal clip that may be used in connection with dynamo electric machines, and contemplates the provision of a device of this character, the principal parts of which are formed from a single piece of sheet metal. Briefly I form the brush holder element from an initially rectangular piece of sheet metal which has its lateral edges brought together and is conformed to provide a cylindrical brush holder, within which is placed the usual carbon or other suitable brush and its spring, both of which coöperate with the collector ring of the dynamo electric machine in a well known manner. Extending from one end of the metal forming the cylindrical brush holder and integral therewith is a strip, the width of which is substantially equal to the diameter of the brush holder just mentioned. This strip is bent upon itself to constitute a terminal, which, *per se*, may be of well known form, and in addition thereto is so disposed as to constitute both an end closure for the cylindrical brush holder and an abutment for the brush spring.

The construction which has been briefly described is cheap to manufacture and is extremely reliable, since the brush holder is integral with the terminal clip, which arrangement insures a good connection between the brush holder and the conductor clamped between the jaws of the terminal clip.

As will hereinafter more fully appear, I prefer to strike small ears or lugs from the surface of the metal brush holder, and to inclose the brush holder in an insulating sleeve, which preserves the cylindrical conformation of the brush holder and provides a suitable means for mounting the combined brush holder and terminal on the frame of a dynamo electric machine.

In the accompanying drawings illustrating my invention—

Figure 1 is an isolated view in perspective illustrating the combined brush holder and terminal of my invention;

Fig. 2 is a vertical sectional view of the same in operative position on the frame of a dynamo electric machine; and Fig. 3 is a sectional view taken on the line 3—3 of Fig. 2.

As is most clearly illustrated in Fig. 1, the device of my invention comprises a terminal clip, indicated as a whole by the reference numeral 10, and a cylindrical brush holder 11. I have not deemed it necessary to illustrate the blank from which the device is formed, as it is apparent from the drawing that the cylindrical brush holder 11 is formed of an initially rectangular piece of metal, which has its lateral edges brought together and is shaped to form the cylindrical brush holder. Projecting from one end of the metal constituting the cylindrical brush holder and integral therewith is a strip of metal, the width of which is substantially equal to the diameter of the cylindrical brush holder. This strip is turned at right angles to the axis of the brush holder, so that the portion 12 of the strip constitutes an end closure for the brush holder, and likewise an abutment for the brush spring presently to be referred to. The strip mentioned, other than the portion 12 thereof, which constitutes the brush holder end closure, provides a terminal clip 10, as shown, the free end of the strip turned at right angles to the portion 12 thereof and conformed to provide what may be termed the resistant body portion 13 and the spring arm 13ª of a known form of terminal clip. As the details of the clip *per se* are not important, it will suffice to say that the spring arm may be provided with the usual slot 14 coöperating with the apertured ear 15, carried by the resistant or body portion 13 of the clip.

I prefer to strike a plurality of lugs or ears 11ª from the cylindrical surface of the brush holder 11, and to inclose the brush holder in a sleeve 18 of vulcanite or other insulating material which is molded therearound. Due to the lugs 11ª relative movement between the brush holder and sleeve is prevented, the sleeve serving the two-fold function of insulating the brush holder from the framework of the machine by which it is carried, and at the same time preserving the cylindrical conformation of the brush holder without making it necessary to solder, weld or otherwise secure together, the adjacent lateral elges of the initially rectangular piece of metal of which the brush holder is formed. The sleeve 18 is conveniently provided with an annular flange 19 and a longitudinal rib 20, arranged to coöperate with a corresponding slot in the boss 21 of the machine frame 22, by which the device is carried. A nut 23, coöperating with boss 21 and bearing against the flange 19, holds the sleeve 18 and the brush holder and terminal clip in position.

At 24 I have shown the collector ring with which coöperates the brush 25 of carbon or other suitable material. The brush 25 is slidable within the brush holder 11, and is held in contact with the collector ring by a spring 26, the lower end of which engages around a knob or boss 27 forming a part of the brush and the upper end of which bears against the brush holder end closure 12. I am aware that cylindrical brush holders are old, and I am also aware of the fact that flat metal terminal clips generally similar to the one herein shown are old. I do not claim either of these as my invention, nor do I claim any heretofore known arrangement of using one with the other.

What I claim as my invention is:

1. A combined brush holder and terminal clip comprising a single piece of sheet metal consisting of an initially substantially rectangular body portion conformed to provide a cylindrical brush holder, and a comparatively narrow strip extending from one end of the body portion, said narrow strip turned at right angles to the axis of the cylindrical brush holder formed by said body portion and constituting an end closure for said cylindrical brush holder, said narrow strip being turned upon itself to constitute the body portion and spring arm of a terminal clip of the sheet metal type.

2. A combined brush holder and terminal clip comprising a single piece of sheet metal consisting of an initially substantially rectangular body portion and a strip extending from one end of the body portion, said body portion having its lateral edges brought together and conformed to constitute a cylindrical brush holder, said strip being of a width substantially equal to the diameter of said cylindrical brush holder, and being bent at right angles to the axis thereof, to provide an end closure for the brush holder, and an abutment for a brush spring, said strip being turned upon itself to constitute the resistant body portion and spring arm of a terminal clip of the sheet metal type.

3. A combined brush holder and terminal comprising a cylindrical metal brush holder and a strip integral with the brush holder, and extending from one end thereof, said strip being bent at right angles to the axis of the brush holder, and constituting an end closure for the latter, and being conformed and adapted to constitute a terminal whereby electrically to connect a conductor with said brush holder.

4. A combined brush holder and terminal comprising an initially substantially rectangular piece of sheet metal having its lateral edges brought together and conformed to constitute a cylindrical brush holder, and metal integral with the cylindrical brush holder projecting from one end thereof, conformed and disposed to provide an end closure for said brush holder and a terminal whereby electrically to connect a conductor with the brush holder.

5. A combined brush holder and terminal comprising an initially substantially rectangular piece of sheet metal having its lateral edges brought together and conformed to constitute a cylindrical brush holder, metal integral with the cylindrical brush holder projecting from one end thereof, conformed and disposed to provide an end closure for said brush holder and a terminal whereby electrically to connect a conductor with the brush holder, an integral lug projecting from the cylindrical surface of said brush holder, and a sleeve of insulating material around said brush holder, serving to preserve the cylindrical conformation of the brush holder, substantially as described.

In witness whereof, I hereunto subscribe my name this 12th day of January, A. D. 1918.

WALTER BROWN.

Witnesses:
DAGMAR PETERSON,
GILBERT BROWN.